(12) United States Patent
Kegel et al.

(10) Patent No.: US 9,239,804 B2
(45) Date of Patent: Jan. 19, 2016

(54) BACK-OFF MECHANISM FOR A PERIPHERAL PAGE REQUEST LOG

(71) Applicants: Advanced Micro Devices, Inc., Sunnyvale, CA (US); ATI Technologies ULC, Markham (CA)

(72) Inventors: Andrew Kegel, Redmond, WA (US); Jimshed Mirza, Markham (CA); Paul Blinzer, Bellevue, WA (US); Philip Ng, Markham (CA)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 28 days.

(21) Appl. No.: 14/045,701

(22) Filed: Oct. 3, 2013

(65) Prior Publication Data

US 2015/0100818 A1 Apr. 9, 2015

(51) Int. Cl.
*G06F 11/07* (2006.01)
*G06F 13/00* (2006.01)
*G06F 12/10* (2006.01)
*G06F 12/00* (2006.01)
*G06F 13/38* (2006.01)

(52) U.S. Cl.
CPC .............. *G06F 13/00* (2013.01); *G06F 11/073* (2013.01); *G06F 11/0745* (2013.01); *G06F 11/0793* (2013.01); *G06F 12/00* (2013.01); *G06F 12/10* (2013.01); *G06F 12/1009* (2013.01); *G06F 12/1081* (2013.01); *G06F 13/385* (2013.01)

(58) Field of Classification Search
None
See application file for complete search history.

(56) References Cited

U.S. PATENT DOCUMENTS

| | | | |
|---|---|---|---|
| 7,206,857 B1* | 4/2007 | Mammen et al. | 709/238 |
| 7,594,047 B2* | 9/2009 | Luk | 710/52 |
| 7,636,800 B2* | 12/2009 | Ben-Yehuda et al. | 710/28 |
| 2003/0074531 A1* | 4/2003 | Forrer, Jr. | 711/118 |
| 2007/0038840 A1* | 2/2007 | Hummel et al. | 711/207 |
| 2008/0209130 A1* | 8/2008 | Kegel et al. | 711/135 |
| 2011/0022818 A1* | 1/2011 | Kegel et al. | 711/206 |
| 2011/0131366 A1* | 6/2011 | Nakai et al. | 711/103 |
| 2012/0017063 A1* | 1/2012 | Hummel et al. | 711/200 |
| 2012/0246381 A1* | 9/2012 | Kegel et al. | 711/6 |
| 2013/0145055 A1* | 6/2013 | Kegel | G06F 710/26 |
| 2014/0164545 A1* | 6/2014 | Davis et al. | 709/212 |

OTHER PUBLICATIONS

'AMD IOMMU Version 2—How KVM will use it' by Jorg Rodel, Aug. 16, 2011.*
Michael Krause et al., "Address Translation Services", 2006, 42 pages, PCI-SIG Developers Conference.
David Mayhew, "Address Translation Services (ATS) Overview", 2008, 29 pages, PCI-SIG Developers Conference.
Steven W. Smith, "The Scientist and Engineer's Guide to Digital Signal Processing", 1997, 2 pages, Chapter 28-Digital Signal Processors, Circular Buffering.

(Continued)

*Primary Examiner* — Steven Snyder
(74) *Attorney, Agent, or Firm* — Park, Vaughan, Fleming & Dowler LLP

(57) ABSTRACT

A system and method of managing requests from peripherals in a computer system are provided. In the system and method, an input/output memory management unit (IOMMU) receives a peripheral page request (PPR) from a peripheral. In response to a determination that a criterion regarding an available capacity of a PPR log is satisfied, a completion message is sent to the peripheral indicating that the PPR is complete and the PPR is discarded without queuing the PPR in the PPR log.

18 Claims, 11 Drawing Sheets

(56) References Cited

OTHER PUBLICATIONS

Advanced Micro Devices, "AMD I/O Virtualization Technology (IOMMU) Specification Revision 2.00", Mar. 24, 2011, 167 pages.

TW Burger, "Intel® Virtualization Technology for Directed I/O (VT-d): Enhancing Intel Platforms for Efficient Virtualization of I/O Devices", Mar. 5, 2012, 8 pages, http://software.intel.com/en-us/articles.

* cited by examiner

BACK-OFF MECHANISM FOR A PERIPHERAL PAGE REQUEST LOG

TECHNICAL FIELD

The present embodiments relate generally to management of peripherals in computing systems, and more specifically to managing address translation service requests and/or peripheral page requests.

BACKGROUND

An I/O memory management unit (IOMMU) stores peripheral page requests (PPRs) from peripherals in a PPR log. When a large number of peripherals generates PPRs, overflow of the PPR log becomes a risk. Overflow of the PPR log causes PPRs to be dropped, resulting in a loss of system state that can make the system unstable. Also, pausing I/O activity to avoid overflow will degrade system performance and may cause system failure.

SUMMARY OF ONE OR MORE EMBODIMENTS

In some embodiments, a method of managing requests from peripherals in a computer system is performed in an IOMMU in the computer system. In the method, a PPR is received from a peripheral. In response to a determination that a criterion regarding an available capacity of a PPR log is satisfied, a completion message is sent to the peripheral indicating that the PPR is complete and the PPR is discarded without queuing the PPR in the PPR log.

In some embodiments, an IOMMU includes a PPR log to store PPRs received from peripherals. The IOMMU also includes response generation logic to generate a completion message directed to a respective peripheral, in response to a determination that a criterion regarding an available capacity of the PPR log is satisfied. The completion message indicates that a PPR from the respective peripheral that has not been stored in the PPR log is complete.

BRIEF DESCRIPTION OF THE DRAWINGS

The present embodiments are illustrated by way of example and are not intended to be limited by the figures of the accompanying drawings.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1A:
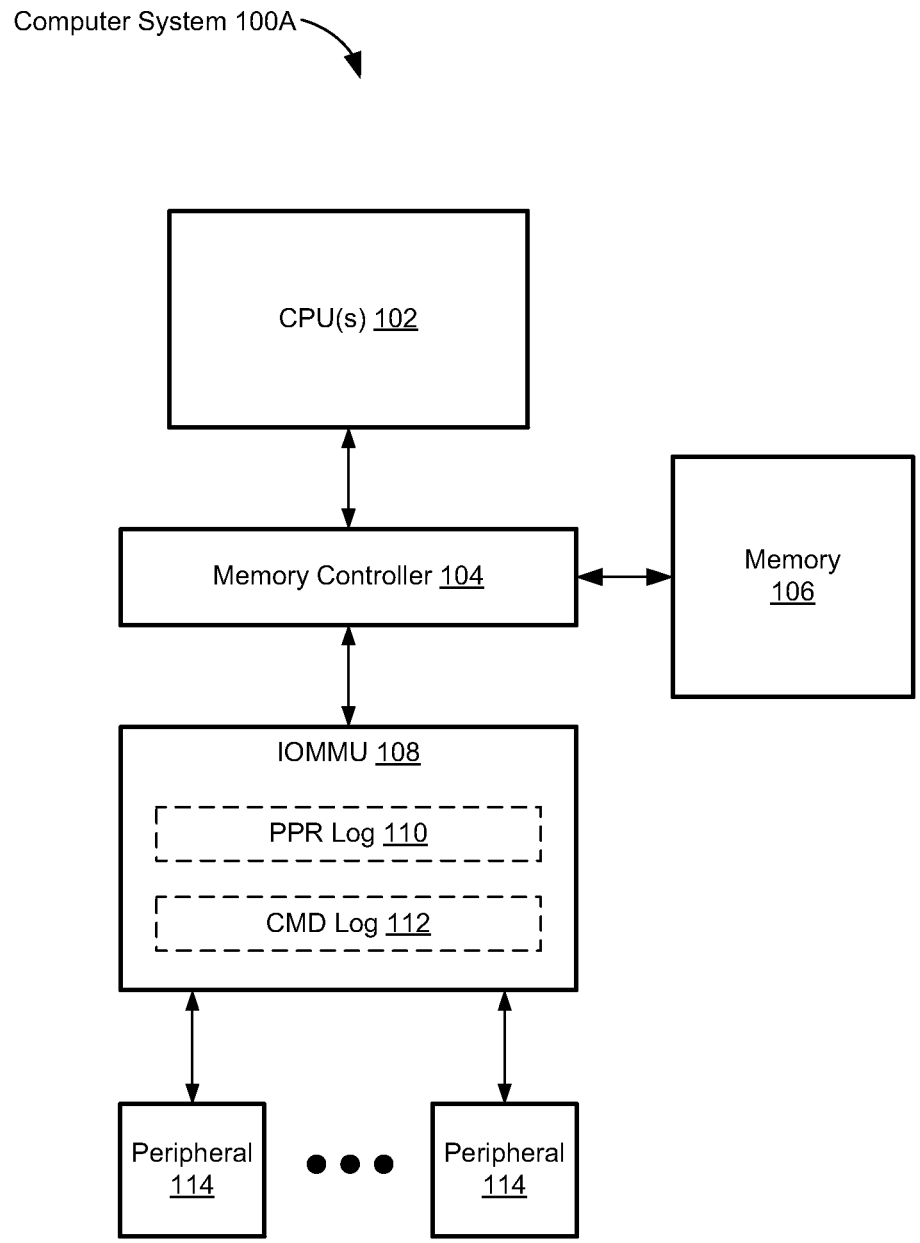
FIGS. 1A and 1B are block diagrams of computer systems in accordance with some embodiments.

FIG. 1A is a block diagram of a computer system 100A in accordance with some embodiments. The computer system 100A includes one or more CPUs 102, memory 106, and peripherals 114. The one or more CPUs 102 may each include one or more processor cores, each of which executes one or more threads. The memory 106 includes main memory and may include one or more levels of cache memory. (The one or more CPUs 102 may also include one or more levels of cache memory.) In some embodiments, the main memory is implemented in dynamic random access memory (DRAM) and the one or more levels of cache memory are implemented in static random access memory (SRAM). Examples of peripherals 114 include, but are not limited to, network interface cards (NICs), other input/output (I/O) devices, and storage devices (e.g., hard-disk drives, solid-state drives such as flash drives, etc.).

A memory controller 104 couples the one or more CPUs 102 to the memory 106, thereby providing the one or more CPUs 102 with access to the memory 106.

The peripherals 114 are coupled to an input/output memory management unit (IOMMU) 108, which is coupled to the memory controller 104. The IOMMU 108 and memory controller 104 thus couple the peripherals 114 to the one or more CPUs 102 and to the memory 106. The IOMMU 108 may also be referred to, for example, as a peripheral MMU, a system MMU, a translation agent system, or virtualization technology for directed I/O (Vt-d). In some embodiments, the IOMMU 108 communicates with the peripherals 114 in accordance with the Peripheral Component Interconnect Express (PCIe) protocol, through respective PCIe links.

The IOMMU 108 performs address translation for the peripherals 114: it translates virtual addresses provided by the peripherals 114 into physical addresses in the memory 106. The peripherals 114 may use these physical addresses to perform direct memory access (DMA) in the memory 106, through the IOMMU 108. If a peripheral 114 requests address translation for a page of memory that is not available in the memory 106, the result is a page fault. The peripheral 114 responds to the page fault by issuing a peripheral page request (PPR) requesting allocation of the page. PPRs are stored in a PPR log 110 in the IOMMU 108 before being provided to the one or more CPUs 102 (e.g., as interrupts). Software running on the one or more CPUs 102 then processes the PPRs. The software allocates a requested page by bringing it into the memory 106 from a peripheral storage device (e.g., a hard-disk drive or solid-state drive). A command (CMD) log 112 in the IOMMU 108 stores responses to PPRs; the IOMMU 108 provides these responses to respective peripherals 114. The PPR log 110 and command log 112 may also be referred to as a PPR queue and command queue, respectively.

While the PPR log 110 and command log 112 are shown as being situated in the IOMMU 108, entries in the PPR log 110 and/or command log 112 may be stored in the memory 106 (e.g., in main memory). The IOMMU 108 includes registers that store pointers to the entries along with other information that defines the PPR log 110 and/or command log 112. For example, the PPR log 110 and command log 112 may each be implemented as a circular buffer 200 (FIG. 2) defined by values stored in registers in the IOMMU 108 and having entries stored in the memory 106 (e.g., in main memory). Because of the presence of these registers in the IOMMU 108, the PPR log 110 and command log 112 are considered to be part of the IOMMU 108, even with the entries being stored in the memory 106.

In some embodiments, the memory controller 104 is integrated with the one or more CPU(s) 102, such that it is situated on the same semiconductor die (and thus the same chip) as the one or more CPU(s) 102. Alternatively, the memory controller 104 may be situated on a separate chip from the one or more CPU(s) 102. The IOMMU 108 may be situated on the same chip as the memory controller 104 and/or the one or more CPU(s) 102, or on a different chip.

Figure 1B:
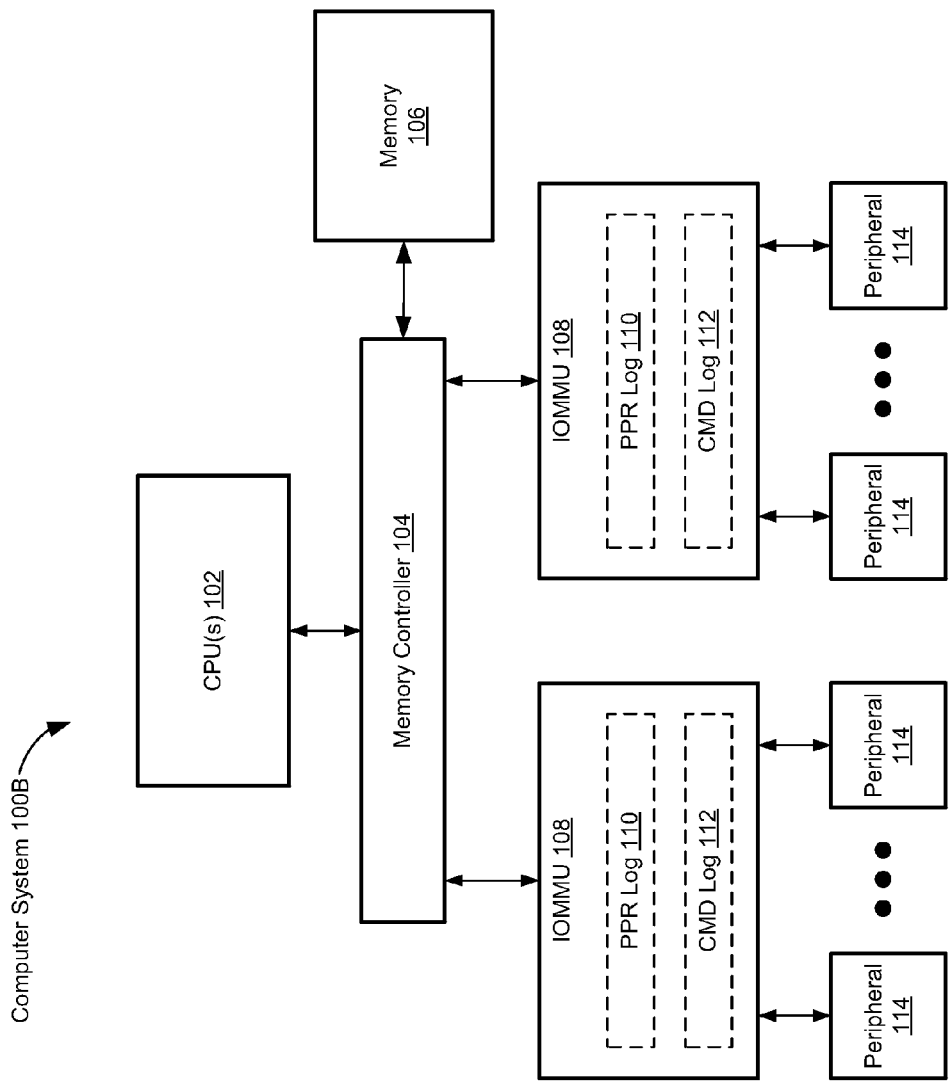

FIG. 1B is a block diagram of another computer system 100B in accordance with some embodiments. In the computer system 100B, a first group of peripherals 114 is coupled to a first IOMMU 108 (e.g., through respective PCIe links) and a second group of peripherals 114 is coupled to a second IOMMU 108 (e.g., through respective PCIe links). The first and second IOMMUs 108 are coupled to the memory controller 104 and thereby to the one or more CPUs 102 and the memory 106. The first and second IOMMUs 108 each include a PPR log 110 and a command log 112.

The computer systems 100A and 100B are merely examples of computer systems that use IOMMUs 108; other examples are possible. For example, a computer system may include more than two IOMMUs 108, each coupled to a respective group of peripherals 114 and including a PPR log 110 and a command log 112. Each IOMMU 108 may be coupled to respective peripherals 114 through an I/O hub, which may include integrated peripherals 114.

The peripherals 114 coupled to an IOMMU 108 in a system such as the system 100A or 100B may number in the thousands or tens of thousands, in accordance with some embodiments. For example, PCIe theoretically allows for 65,536 peripherals 114. With so many peripherals 114 potentially generating PPRs, overflow of the PPR log 110 becomes a risk.

Figure 2:
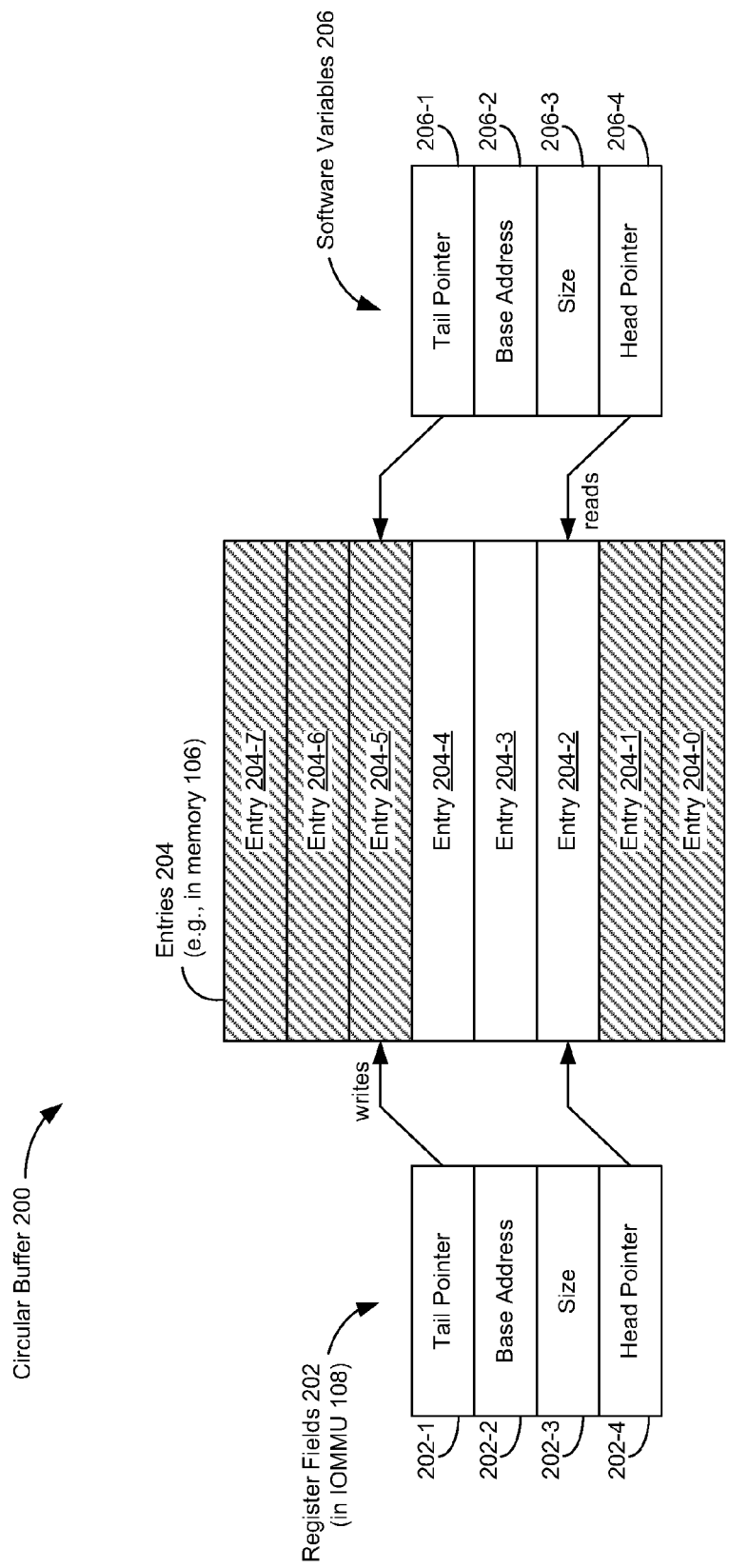
FIG. 2 is a block diagram of a circular buffer used to implement a log in an IOMMU in accordance with some embodiments.

FIG. 2 is a block diagram of a circular buffer 200 used to implement a PPR log 110 or a command log 112 (FIGS. 1A-1B) in accordance with some embodiments. Register fields 202 for the circular buffer 200 include a tail pointer register field 202-1 to store a tail pointer for the circular buffer 200, a base address register field 202-2 to store a base address of the circular buffer 200, a size register field 202-3 to store a size of the circular buffer 200, and a head pointer register field 202-4 to store a head pointer for the circular buffer 200. A plurality of entries 204 (e.g., entries 204-0 through 204-7) in the circular buffer 200 are stored in the memory 106 (e.g., in main memory). The base address is the address of a first entry 204-0 or portion thereof. The entries 204-0 through 204-7 are indexed by offsets from the first entry 204-0, such that the base address plus the size is the address of the last entry 204-7. In one example, each entry is 128 bits (i.e., 16 bytes) and the offsets are multiples of 16 (e.g., the index for entry 204-0 is +00, the index for entry 204-1 is +16, and the index for entry 204-7 is +112). In this example, the circular buffer is a 128-byte buffer. In general, however, the size and number of entries 204, and thus the overall size of the circular buffer 200, various for different implementations.

In some embodiments, the head pointer points to the first valid entry 204 and the tail pointer points to the first invalid (i.e., empty) entry 204. The head pointer register field 202-4 thus stores the index for the first valid entry 204 and the tail pointer register field 202-1 thus stores the index for the first invalid entry 204. In the example of FIG. 2, the circular buffer 200 currently has three valid entries: entries 204-2, 204-3, and 204-4. The head pointer points to entry 204-2, which is the first valid entry 204. The tail pointer points to entry 204-5, which is the first invalid entry. (FIG. 2 merely illustrates one example of a pointer convention for a circular buffer; other examples are possible.)

The register fields 202 are included in one or more registers in an IOMMU 108. Two or more of the register fields 202 may be in the same register. Alternatively, each of the register fields 202 may be in a separate register.

When the IOMMU 108 creates a new entry in the PPR log 110 or command log 112, it writes to the entry 204 to which the tail pointer points and then increments the tail pointer (wrapping around as necessary). If incrementing the tail pointer would cause the tail pointer to equal the head pointer (i.e., would cause the value in the tail pointer register field 202-1 to equal the value in the head pointer register field 202-4), then the circular buffer 200 is full. Adding another entry 204 when the circular buffer 200 is full would result in overflow.

Software running on the one or more CPUs 102 (FIGS. 1A and 1B) tracks variables 206 associated with the circular buffer 200. The variables 206 correspond to the register fields 202 and include, for example, a tail pointer variable 206-1, base address variable 206-2, size variable 206-3, and head pointer variable 206-4. In some embodiments, when the software reads, and thus consumes, an entry 204, it consumes the entry at the head of the circular buffer 204 (i.e., the first valid entry 204), as identified by the head pointer variable 206-4. For example, it consumes entry 204-2. The software then increments the head pointer variable 206-4 and writes the incremented value of the head pointer variable 206-4 to the head pointer register field 202-4. In the example of FIG. 2, the head pointer register field 202-4 would then store a pointer to the entry 204-3, as would the head pointer variable 206-4. If the circular buffer 200 overflows, however, then entries will be lost and the software will not be able to process the lost entries. For example, if the circular buffer 200 is a PPR log 110, overflow results in loss of PPRs from respective peripherals 114, and thus loss of system state.

Figure 3A:
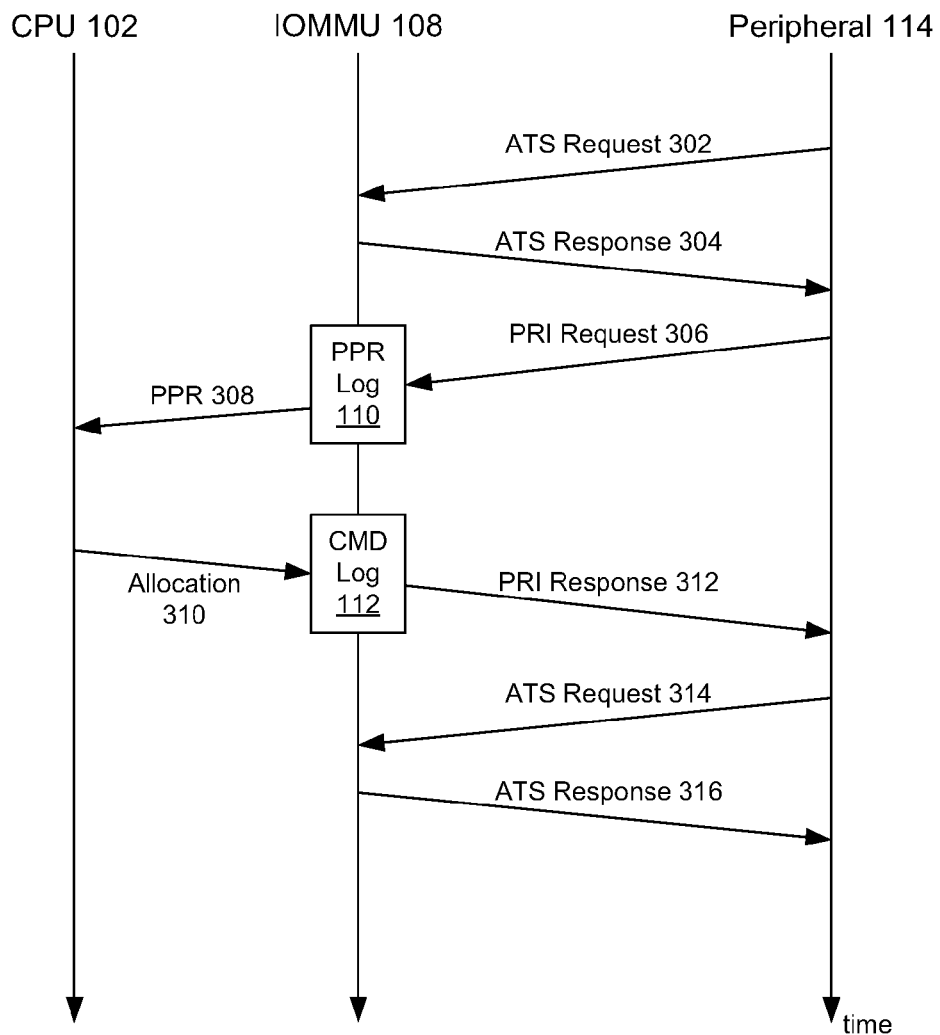
FIG. 3A is a timeline showing a sequence of requests and responses between an IOMMU and a peripheral.

FIG. 3A is a timeline showing a sequence of request and response messages between an IOMMU 108 and a peripheral 114. The peripheral 114 sends an address translation service (ATS) request 302 to the IOMMU 108, requesting translation of a virtual address for a page (or other unit of space in memory) to a physical address. The IOMMU 108 responds with an ATS response 304 denying access to the virtual address and thus indicating that the virtual address is unavailable (e.g., because there is no corresponding physical address in the memory 106, FIG. 1). For example, the ATS response 304 specifies that a write-access variable IW equals zero and that a read-access variable IR equals zero. The unavailability of the virtual address results in a page fault.

To recover from the page fault, the peripheral 114 then sends a page request interface (PRI) request 306 to the IOMMU 108. The PRI request 306 conveys a PPR 308 to the IOMMU 108 requesting allocation of the page in the memory 106 (FIG. 1). The IOMMU 108 stores the PPR 308 in the PPR log 110 and subsequently provides the PPR 308 to the CPU 102. Software running on the CPU 102 allocates the requested page in the memory 106 and sends an allocation message 310 to the IOMMU 108 indicating that the requested page has been allocated. The allocation message 310 is stored in the command log 112 and then sent on to the peripheral 114 in a PRI response 312. The PRI response 312 indicates that the PRI request 306 was successful.

The PRI response 312 prompts the peripheral 114 to send an ATS request 314 to the IOMMU 108. The ATS request 314 is a repeat of the ATS request 302 and requests attributes of the newly allocated page. The IOMMU 108 responds with an ATS response 316 that provides the requested attributes. For example, the ATS response 316 provides the requested address translation (e.g., the physical address of the page) and allowed degree of access to the page. For example, the ATS response may provide full access (e.g., IW=IR=1) or read-only access (e.g., IW=0, IR=1).

The example of FIG. 3A assumes that space is available in the PPR log 110 to store the PPR 308.

Figure 3B:
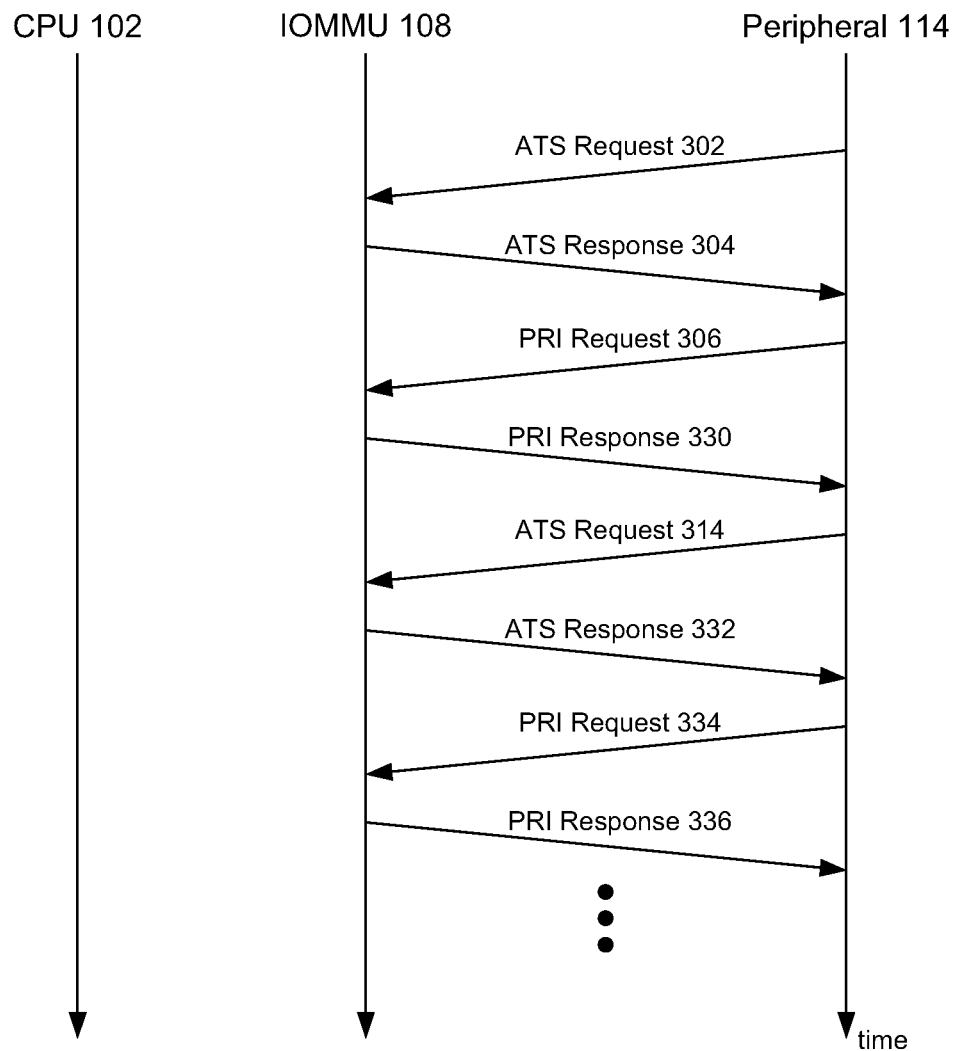
FIGS. 3B-3D are timelines showing sequences of requests and responses between an IOMMU and a peripheral for situations in which a PPR log does not have enough space to store an incoming PPR, in accordance with some embodiments.

FIG. 3B is a timeline showing a sequence of request and response messages between an IOMMU 108 and a peripheral 114 for a situation in which the PPR log 110 does not have enough space to store an incoming PPR from the peripheral 114, in accordance with some embodiments. For example, the PPR log 110 is full. In another example, the PPR log 110 is not full, but all remaining entries in the PPR log 110 are reserved for other requests (e.g., for stop marker messages). In FIG. 3B, the ATS request 302, ATS response 304, and PRI request 306 are communicated between the peripheral 114 and IOMMU 108 in the manner described for FIG. 3A. The PPR in the PRI request 306, however, is not stored in the PPR log 110. Instead, the IOMMU 108 sends a PRI response 330 to the peripheral 114. The PRI response 330 indicates that the PRI request 306 is complete and that the PPR in the PRI request 306 therefore has been processed, even though the PPR actually has not been processed.

In response to the PRI response 330, the peripheral 114 sends an ATS request 314 to the IOMMU 108. The ATS request 314 is a repeat of the ATS request 302, as described for FIG. 3A. The IOMMU 108 responds with an ATS response 332 denying access to the requested page. The ATS response 332 is a repeat of the ATS response 304 and prompts the peripheral 114 to send another PRI request 334. In response, the IOMMU 108 sends a PRI response 336 to the peripheral 114. The PRI response 336, like the PRI response 330, indicates that the PPR in the PRI request 334 has been processed, even though the PPR actually has not been processed, since it was never stored in the PPR log 110. ATS requests, ATS responses, PRI requests, and PRI responses continue to be sent back and forth in this sequence until an entry for the PPR becomes available in the PPR log 110.

The sequence of FIG. 3B allows systems such as the system 100A or 100B to keep functioning without loss of system state when the PPR log 110 lacks capacity for storing received PPRs. However, the back-and-forth traffic in the sequence of FIG. 3B contends with other traffic (e.g., DMA traffic) and consumes power.

Figure 3C:
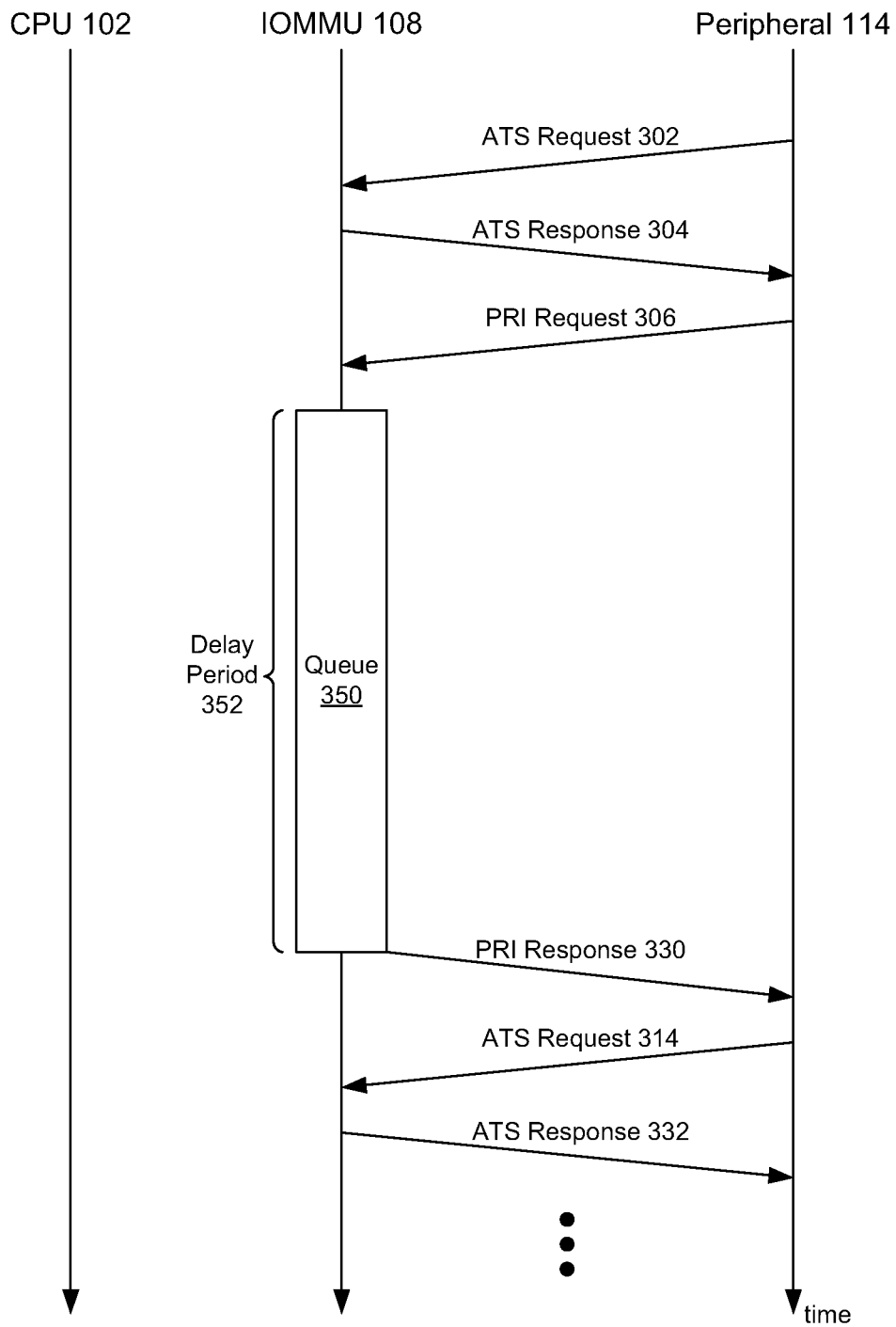

FIG. 3C is a timeline showing another sequence of request and response messages between an IOMMU 108 and a peripheral 114 for a situation in which the PPR log 110 does not have enough space to store an incoming PPR from the peripheral 114, in accordance with some embodiments. The sequence of FIG. 3C reduces the back-and-forth traffic of FIG. 3B by introducing a delay between the PRI request 306 and PRI response 330. (Subsequent PRI responses in the sequence are similarly delayed with respect to their corresponding PRI requests.) Sending of the PRI response 330 is delayed by a delay period 352. In some embodiments, the delay period 352 is software programmable. During the delay period 352, information regarding the PPR in the PRI request 306 is stored in a PRI response delay queue 350, which is distinct from the PPR log 110. This information is used to generate the PRI response 330 and includes, for example, a device identifier for the peripheral 114 that sent the PRI request 306 and an index associated with the PRI request 306 (e.g., a page request group index). The PRI response 330 is followed by the ATS request 314, the ATS response 332, and subsequent requests and responses.

The delay period 352 thus results in reduced power and increased bandwidth for other traffic, such as DMA traffic.

Figure 3D:
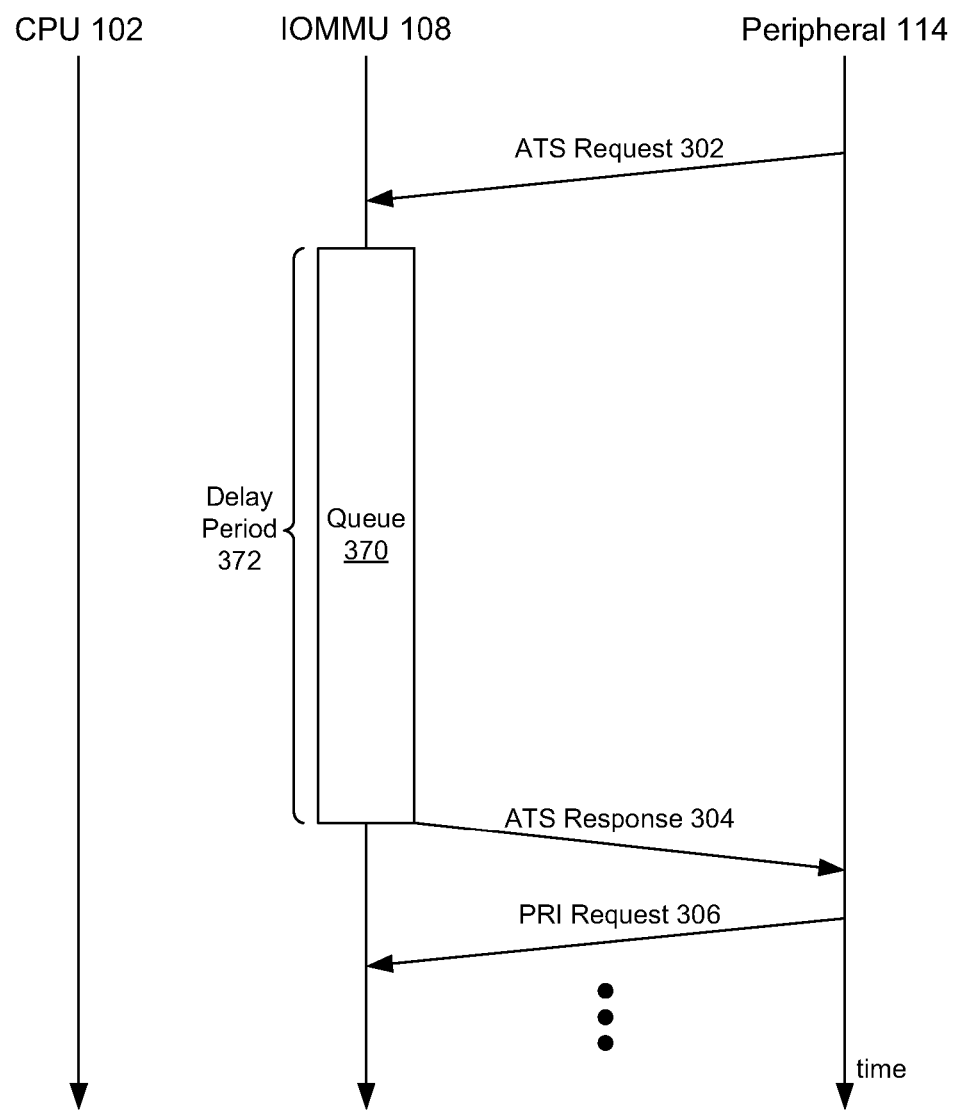

The back-and-forth traffic of FIG. 3B may also be reduced by introducing a delay between the ATS request 302 and ATS response 304, as shown in FIG. 3D in accordance with some embodiments. Sending of the ATS response 304 is delayed by a delay period 372 when the PPR log 110 does not have enough space to store an incoming PPR. In some embodiments, the delay period 372 is software programmable. During the delay period 372, information regarding the ATS request 302 is stored in an ATS response delay queue 370, which is distinct from the PPR log 110 and/or the queue 350 (FIG. 3C). This information is used to generate the ATS response 304. The ATS response 304 is followed by subsequent requests and responses, by analogy to FIG. 3B or 3C.

In some embodiments, both the delay period 352 (FIG. 3C) and the delay period 372 (FIG. 3D) are used to reduce back-and-forth traffic. Alternatively, only one of the delay periods 352 and 372 is used.

Figure 4:
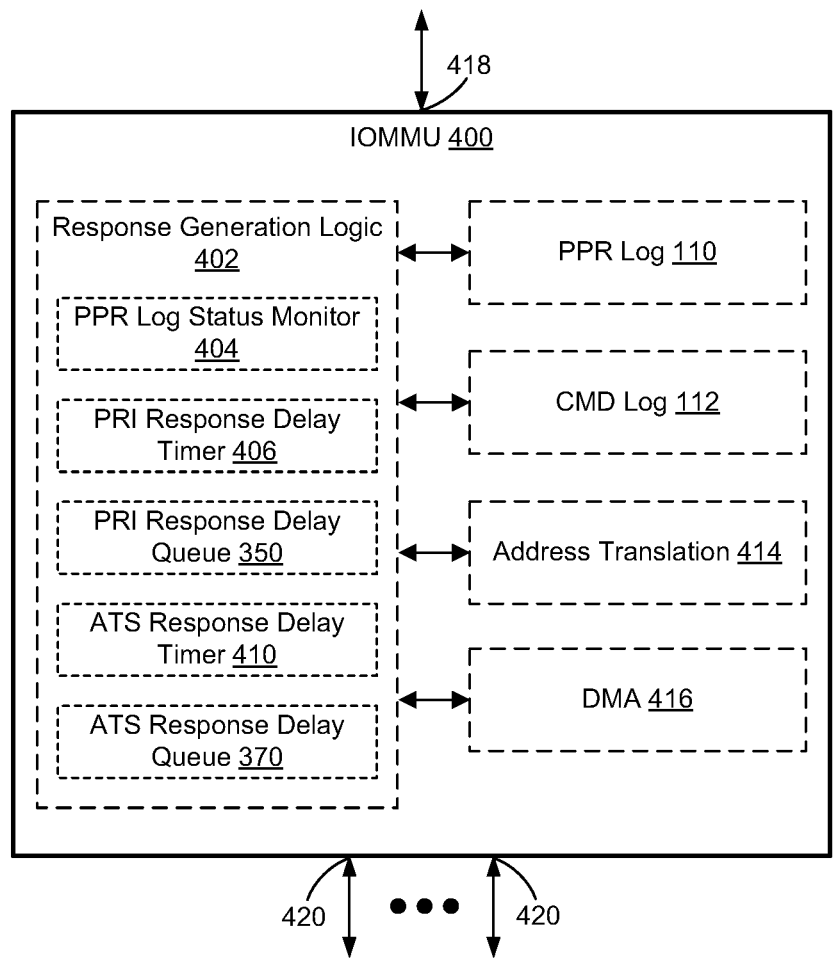
FIG. 4 is a block diagram of a portion of an IOMMU in accordance with some embodiments.

FIG. 4 is a block diagram of a portion of an IOMMU 400 in accordance with some embodiments. The IOMMU 400 is an example of an IOMMU 108 (FIGS. 1A-1B). In addition to the PPR log 110 and command log 112, the IOMMU 400 includes an address translation module 414 for translating virtual addresses to physical addresses (e.g., by walking page tables and/or using a translation look-aside buffer) and a DMA module 416 for performing direct memory accesses.

The IOMMU 400 also includes response generation logic 402 for generating ATS responses and/or PRI responses (e.g., as shown in FIGS. 3A-3D). The response generation logic 402 includes a PPR log status monitor 404 to determine whether the available capacity of the PPR log 110 has become limited to a point that the response generation logic should generate the PRI responses 330 and 336 (FIGS. 3B-3C), implement the delay period 352 (FIG. 3C), and/or implement the delay period 372 (FIG. 3D). In some embodiments, the response generation logic 402 also includes a PRI response delay timer 406 for implementing the delay period 352 (FIG. 3C) and a PRI response delay queue 350, as described with respect to FIG. 3C. In some embodiments, the response generation logic 402 also includes an ATS response delay timer 410 for implementing the delay period 372 (FIG. 3D) and an ATS response delay queue 370, as described with respect to FIG. 3D. In some embodiments, the delay periods 352 and/or 372 may be cut short in response to a determination by the PPR log status monitor 404 that the available capacity of the PPR log 110 is sufficient to store an incoming PPR (e.g., as conveyed by a PRI message). The PRI response delay queue 350 and/or the ATS response delay queue 370 may be implemented as circular buffers 200 (FIG. 2).

The PRI response delay queue 350 stores information regarding multiple PPRs that are not queued in the PPR log 110 and for which corresponding PRI responses 330 and 336 are being delayed. If the PRI response delay queue 350 becomes full or nearly full, one or more entries may be drained from the PRI response delay queue 350 and the corresponding PRI responses 330 or 336 sent before expiration of their respective delay periods 352 (FIG. 3C). For example, it is determined that an available capacity of the PRI response delay queue 350 is less than, or less than or equal to, a threshold. In response, one or more PRI responses 330 carrying completion messages for respective PPRs are sent to respective peripherals 114 that issued the respective PPRs, without waiting for expiration of the respective delay periods 352, and the information regarding the respective PPRs is deleted from the PRI response delay queue 350. The ATS response delay queue 370 may be drained in a similar manner when it becomes full or nearly full.

The IOMMU 400 includes an interface 418 for coupling the IOMMU 400 to the memory controller 104 (FIGS. 1A-1B) and interfaces 420 (e.g., PCIe interfaces) for coupling the IOMMU 400 to respective peripherals 114 (FIGS. 1A-1B).

Figure 5A:
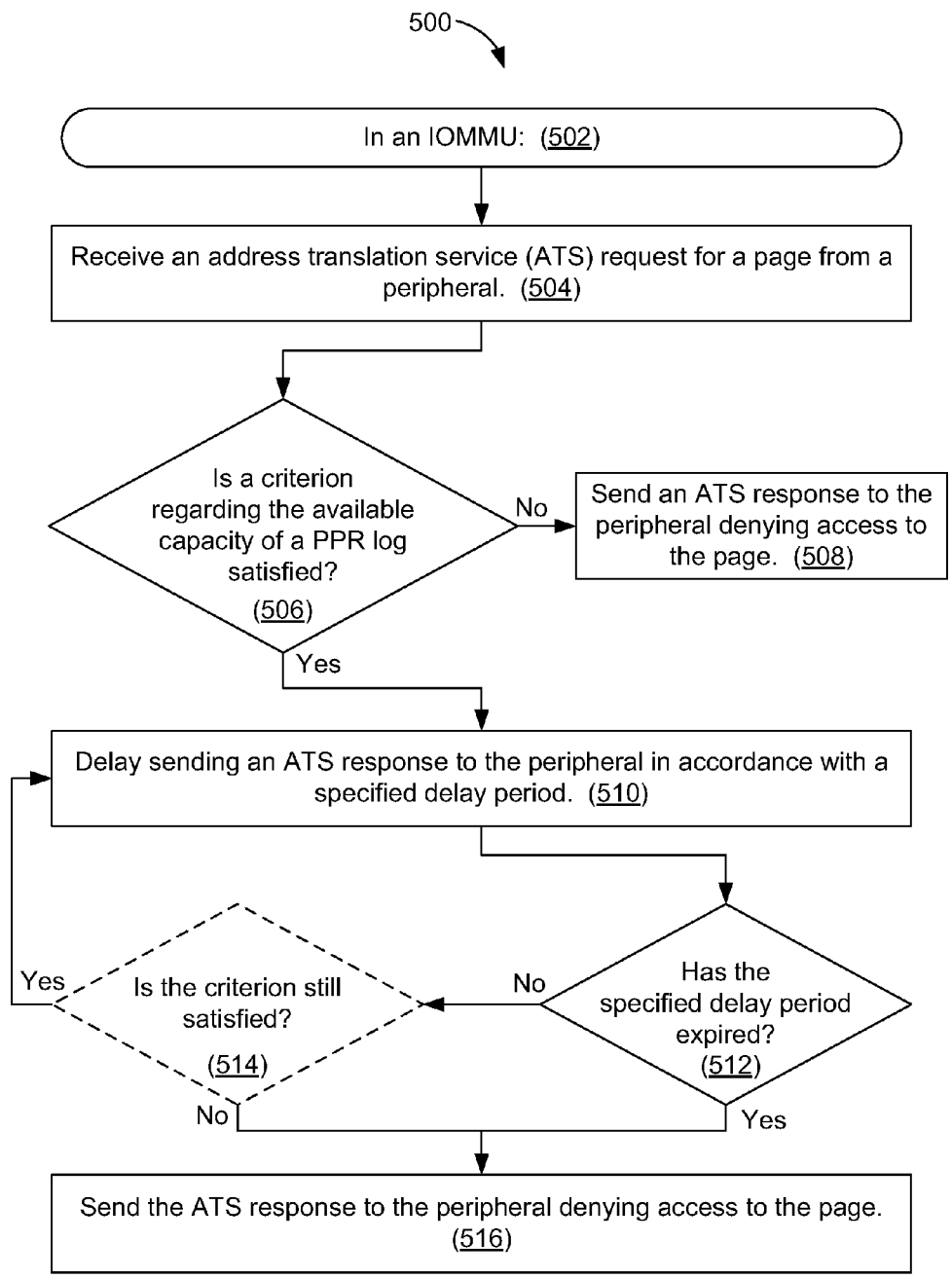
FIGS. 5A and 5B are flowcharts showing methods of managing requests from peripherals in accordance with some embodiments.

FIG. 5A is a flowchart showing a method 500 of managing requests from peripherals 114 in accordance with some embodiments. The method 500 is performed (502) in an IOMMU 108 (FIGS. 1A-1B). For example, the method 500 may be performed in an IOMMU 400 (FIG. 4).

In the method 500, an ATS request 302 (FIGS. 3A-3D) for a page is received (504) from a peripheral 114. The requested page is not accessible (e.g., is not available in the memory 106, FIG. 1).

It is determined (506) whether a criterion regarding the available capacity of a PPR log 110 is satisfied. For example, it is determined whether the available capacity of the PPR log 110 is less than, or less than or equal to, a threshold. In some embodiments, this determination involves determining whether the number of valid entries (e.g., valid entries 204, FIG. 2) in the PPR log 110 is greater than, or greater than or equal to, a threshold. In some embodiments, this determination involves determining whether the number of invalid entries (e.g., invalid entries 204, FIG. 2) in the PPR log 110 is less than, or less than or equal to, a threshold. In some embodiments, this determination involves determining whether the PPR log 110 is full or whether all remaining entries in the PPR log 110 are reserved (e.g., for a specified type of message, such as stop-marker messages).

If the criterion is not satisfied (506-No), an ATS response 304 (FIG. 3A) is sent (508) to the peripheral 114 denying access to the page.

If the criterion is satisfied (506-Yes), sending of the ATS response 304 to the peripheral 114 is delayed (510) (e.g., in accordance with a specified delay period 372, FIG. 3D). Information regarding the ATS request 302 may be stored during the delay in a queue (e.g., the ATS response delay queue 370, FIGS. 3D and 4) that is distinct from the PPR log 110. In some embodiments, sending of the ATS response 304 is delayed until the specified delay period 372 has expired (512-Yes) (e.g., as shown in FIG. 3D) or until a determination is made (514-No) that the criterion regarding the available capacity of the PPR log 110 is no longer satisfied. The determination 514 may include determining that the available capacity of the PPR log 110 has become greater than, or greater than or equal to, a threshold. The ATS response 304 is then sent (516) to the peripheral 114, denying access to the page. The duration of the delay therefore may be less than the specified delay period 372, as a result of the determination 514. Alternatively, the determination 514 is omitted from the method 500, and sending of the ATS response is delayed until the specified delay period 372 expires (512-Yes).

Figure 5B:
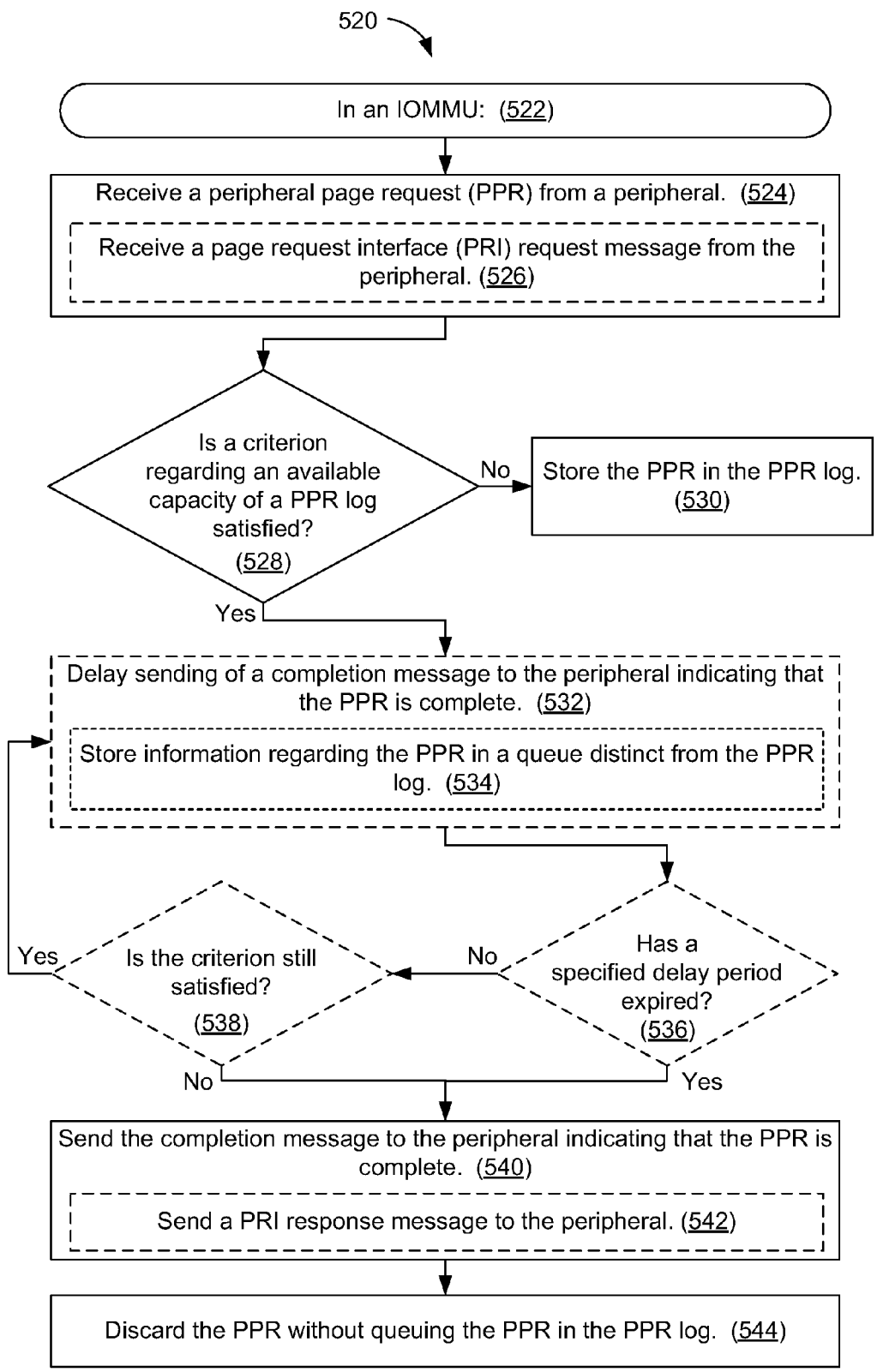

FIG. 5B is a flowchart showing a method 520 of managing requests from peripherals 114 in accordance with some embodiments. The method 520 is performed (522) in an IOMMU 108 (FIGS. 1A-1B), such as the IOMMU 400 (FIG. 4). The method 520 may be performed in conjunction with the method 500 (FIG. 5A). For example, the method 520 may follow on from the method 500.

In the method 520, a PPR is received (524) from a peripheral 114 (e.g., the peripheral 114 of the method 500). In some embodiments, receiving the PPR includes receiving (526) a PRI request 306 (FIGS. 3A-3D) from the peripheral 114.

It is determined (528) whether a criterion regarding the available capacity of a PPR log 110 is satisfied. This determination may be made as described for the determination 506 of the method 500 (FIG. 5A).

If the criterion is not satisfied (528-No), the PPR is stored (530) in the PPR log 110.

If the criterion is satisfied (528-Yes), a completion message is sent (540) to the peripheral 114 indicating that the PPR is complete and the PPR is discarded (544) without queuing the PPR in the PPR log 110. In some embodiments, sending the completion message includes sending (542) a PRI response message 330 (FIGS. 3B and 3C) to the peripheral 114.

In some embodiments, sending of the completion message is delayed (532) (e.g., in accordance with a specified delay period 352, FIG. 3C). Information regarding the PPR may be stored (534) during the delay in a queue (e.g., the PRI response delay queue 350, FIGS. 3C and 4) that is distinct from the PPR log 110. In some embodiments, sending of the completion message is delayed until the specified delay period 352 has expired (536-Yes) (e.g., as shown in FIG. 3C) or until a determination is made (538-No) that the criterion regarding the available capacity of the PPR log 110 is no longer satisfied. The determination 538 may include determining that the available capacity of the PPR log 110 has become greater than, or greater than or equal to, a threshold. The duration of the delay therefore may be less than the specified delay period 352, as a result of the determination 538. Alternatively, the determination 538 is omitted from the method 520, and sending of the completion message is delayed until the specified delay period 352 expires (536-Yes).

Figure 5C:
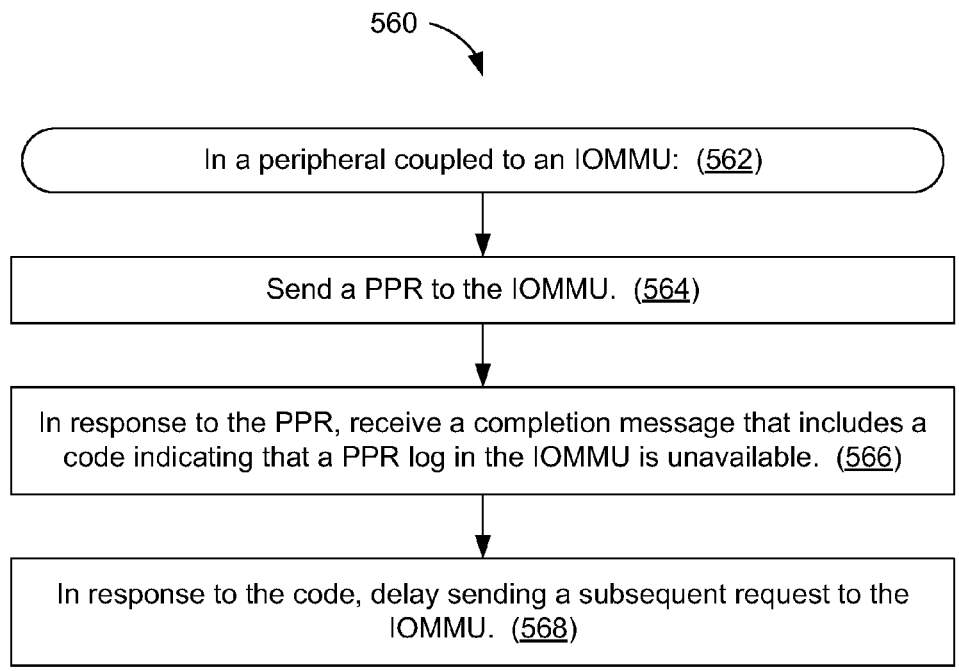
FIGS. 5C and 5D are flowcharts showing methods of operating a peripheral coupled to an IOMMU in accordance with some embodiments Like reference numerals refer to corresponding parts throughout the figures and specification.
Figure 5D:
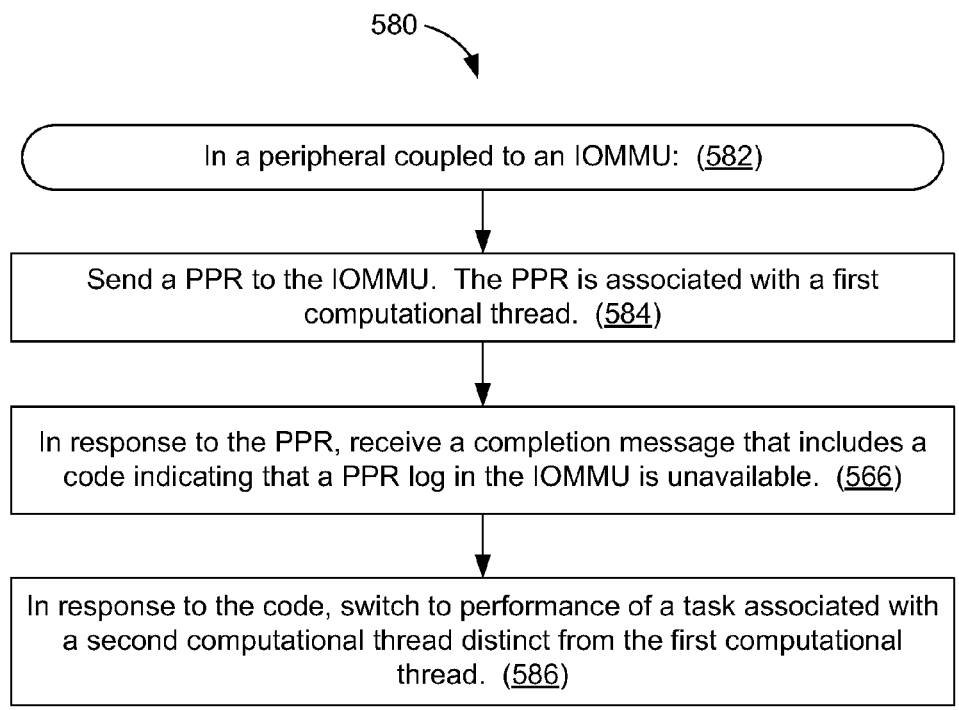

In some embodiments, the completion message includes a code to indicate to the peripheral 114 that the PPR log 110 is unavailable, as determined by satisfaction of the criterion of the operation 528. FIGS. 5C and 5D are flowcharts showing respective methods 560 and 580 that illustrate examples of responses to this code, in accordance with some embodiments.

In the method 560 (FIG. 5C), as performed (562) in the peripheral 114 of the method 520 (FIG. 5B), the PPR that the IOMMU 108 receives in the operation 524 (FIG. 5B) is initially sent (564) to the IOMMU 108. In response, the peripheral 114 receives (566) the completion message sent in the operation 540 (FIG. 5B). The completion message includes the code indicating that the PPR log 110 is unavailable. In response to the code, the peripheral delays (568) sending a subsequent request (e.g., an ATS request 314, FIGS. 3B-3C) to the IOMMU 108. This delay provides the same benefits as the delay periods 352 (FIG. 3C) and 372 (FIG. 3D).

In the method 580 (FIG. 5C), as performed (582) in the peripheral 114 of the method 520 (FIG. 5B), the PPR that the IOMMU 108 receives in the operation 524 (FIG. 5B) is initially sent (584) to the IOMMU 108. The PPR is associated with a first computational thread. In response, the peripheral 114 receives (566) the completion message, as described in the method 560 (FIG. 5C). The peripheral 114 responds to the code by switching (586) to performance of a task associated with a second computational thread distinct from the first computational thread. The method 580 avoids sending repeated requests and responses and allows forward progress to be made on the second computational thread.

The methods 500, 520, 560 and 580 avoid overflow of the PPR log 110 and preserve system state when the PPR log 110 becomes unavailable. Furthermore, the methods 500, 520, 560 and 580 achieve these results in hardware, and thus allow this functionality to be offloaded from the one or more CPUs 102 (FIGS. 1A-1B). While the methods 500, 520, 560 and 580 include a number of operations that appear to occur in a specific order, it should be apparent that the methods 500, 520, 560 and/or 580 can include more or fewer operations, some of which can be executed serially or in parallel. An order of two or more operations may be changed, performance of two or more operations may overlap, and two or more operations may be combined into a single operation.

Embodiments described herein may be implemented in computer hardware. For example, the methods 500 and 520 may be performed in hardware in an IOMMU 108, and the methods 560 and 580 may be performed in hardware in a peripheral 114. Alternatively, embodiments described herein may be implemented in firmware or software. For example, a non-transitory computer-readable storage medium (e.g., in a peripheral 114, FIGS. 1A-1B) may store instructions, configured for execution by a processor, for performing all or a portion of the methods 500, 520, 560, and/or 580.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing requests from peripherals in a computer system, comprising:
   in an input/output memory management unit (IOMMU):
      receiving a peripheral page request (PPR) from a peripheral; and
      in response to a determination that a criterion regarding an available capacity of a PPR log is satisfied:
         sending a completion message to the peripheral indicating that the PPR is complete, the sending comprising sending the completion message without causing a central processing unit (CPU) to process the PPR, wherein sending the completion message comprises delaying the sending based on a specified delay period, wherein the specified delay period is a programmable delay period and the delaying comprises waiting for expiration of the programmable delay period before sending the completion message, and
         discarding the PPR without queuing the PPR in the PPR log.

2. The method of claim 1, wherein the determination comprises a determination that the available capacity of the PPR log is less than, or less than or equal to, a threshold.

3. The method of claim 1, wherein:
   receiving the PPR comprises receiving a page request interface (PRI) request message from the peripheral; and
   sending the completion message comprises sending a PRI response message to the peripheral.

4. The method of claim 1, further comprising, before expiration of the specified delay period, ceasing the delaying and proceeding to send the completion message in response to a determination that the criterion regarding the available capacity of the PPR log is no longer satisfied.

5. The method of claim 4, wherein the determination that the criterion regarding the available capacity of the PPR log is no longer satisfied comprises a determination that the available capacity of the PPR has become greater than, or greater than or equal to, a threshold.

6. The method of claim 1, further comprising, while delaying sending the completion message to the peripheral, storing information regarding the PPR in a queue distinct from the PPR log;
   wherein the information regarding the PPR comprises a device identifier for the peripheral and an index associated with the PPR.

7. The method of claim 6, wherein:
   the PPR is a first PPR;
   the queue stores information regarding multiple PPRs that are not queued in the PPR log and for which corresponding completion messages are being delayed, the multiple PPRs including the first PPR; and
   the method further comprises, in the IOMMU, in response to a determination that an available capacity of the queue is less than, or less than or equal to, a threshold:
      sending a completion message for a respective PPR to a respective peripheral that issued the respective PPR, without waiting for expiration of a respective delay period; and
      deleting information regarding the respective PPR from the queue.

8. The method of claim 1, wherein the PPR requests allocation of a page, the method further comprising, in the IOMMU:
   before receiving the PPR from the peripheral, receiving an address translation service (ATS) request for the page from the peripheral;
   delaying sending an ATS response to the peripheral for a specified delay period, in response to the criterion regarding the available capacity of the PPR log being satisfied; and
   sending the ATS response to the peripheral after expiration of the specified delay period;
   wherein the ATS response denies access to the page.

9. The method of claim 1, wherein the completion message comprises a code to indicate to the peripheral that the PPR log is unavailable.

10. The method of claim 9, further comprising, in the peripheral:
    receiving the completion message; and
    in response to the code in the completion message, delaying sending a subsequent request to the IOMMU.

11. The method of claim 9, wherein the PPR is associated with a first computational thread, the method further comprising, in the peripheral:
    receiving the completion message; and
    in response to the code in the completion message, switching to performance of a task associated with a second computational thread distinct from the first computational thread.

12. An input/output memory management unit (IOMMU), comprising:
    a peripheral page request (PPR) log to store PPRs received from peripherals; and
    response generation logic to generate a completion message directed to a respective peripheral indicating that a PPR from the respective peripheral that has not been stored in the PPR log nor used to cause a central processing unit (CPU) to process the PPR is complete in response to a determination that a criterion regarding an available capacity of the PPR log is satisfied;
    the response generation logic further to delay sending the completion message to the respective peripheral based on a specified delay period, wherein the specified delay period is a programmable delay period and the delaying comprises waiting for expiration of the programmable delay period before sending the completion message.

13. The IOMMU of claim 12, wherein the response generation logic comprises a timer to delay sending of the completion message for the specified delay period.

14. The IOMMU of claim 13, wherein the response generation logic comprises a queue to store information regarding respective PPRs for which corresponding completion messages are being delayed;
   wherein the queue is distinct from the PPR log and the respective PPRs are not stored in the PPR log in response to the criterion regarding the available capacity of the PPR log being satisfied.

15. The IOMMU of claim 13, wherein the response generation logic is to send the completion message before expiration of the timer in response to a determination that the criterion regarding the available capacity of the PPR log is no longer satisfied.

16. The IOMMU of claim 12, wherein the response generation logic comprises a timer to delay sending to a respective peripheral a response to an ATS request from the respective peripheral, the timer being responsive to satisfaction of the criterion regarding the available capacity of the PPR log.

17. The IOMMU of claim 12, wherein the response generation logic is to provide a code in the completion message to indicate to the peripheral that the PPR log is unavailable.

18. An input/output memory management unit (IOMMU), comprising:
   means for receiving a peripheral page request (PPR) from a peripheral;
   means for generating a completion message directed to a respective peripheral indicating that a PPR from the respective peripheral that has not been stored in a PPR log nor used to cause a central processing unit (CPU) to process the PPR is complete in response to a determination that a criterion regarding an available capacity of the PPR log is satisfied; and
   means for delaying sending the completion message to the respective peripheral based on a specified delay period, wherein the specified delay period is a programmable delay period and the delaying comprises waiting for expiration of the programmable delay period before sending the completion message.

* * * * *